United States Patent
Chambers

[11] 3,732,669
[45] May 15, 1973

[54] FUEL GAS SEPARATOR
[75] Inventor: R. William Chambers, Rialto, Calif.
[73] Assignee: Separation and Recovery Systems, Inc., Santa Ana, Calif.
[22] Filed: Sept. 27, 1971
[21] Appl. No.: 183,832

[52] U.S. Cl. ..................55/321, 55/324, 55/327, 55/330, 55/334, 55/341, 55/432, 55/465, 55/481, 55/491, 55/524, 55/527, 55/DIG. 13, 55/DIG. 16
[51] Int. Cl. ..............................................B01d 50/00
[58] Field of Search.......................55/318, 320, 321, 55/322, 323, 324, 325, 327, 330, 332, 333, 462, 465, 482, 484, 485, 486, 522, 524, 527, 334, 341, 432, 481, 491, DIG. 13, DIG. 16

[56] References Cited

UNITED STATES PATENTS

| 1,739,093 | 12/1929 | Ruby | 55/322 X |
| 2,112,335 | 3/1938 | Drennan | 55/315 X |
| 3,386,927 | 6/1968 | Rosecrans et al. | 55/522 X |
| 3,680,286 | 8/1972 | Nostrand et al. | 55/484 |

Primary Examiner—Frank W. Lutter
Assistant Examiner—William Cuchlinski, Jr.
Attorney—Charles E. Willis

[57] ABSTRACT

Apparatus for removing water, gasoline and solid particles from fuel gas as it flows therethrough, including a bank of filter cylinders for the removal of water and solid particles, a filter pad a baffle assembly for the removal of gasoline, and an assembly of non-wettable filter screens for the removal of additional solid particles.

10 Claims, 5 Drawing Figures

PATENTED MAY 15 1973    3,732,669

FUEL GAS SEPARATOR

BACKGROUND OF THE INVENTION

The present invention relates generally to the filtering art, and more particularly to a novel apparatus for removing appreciable amounts of water and gasoline, and solid particles such as sand, scale, and the like, from fuel gas as it flows from the well or from a conventional scrubber.

It is well known that a higher price can be obtained for "clean" fuel gas, as compared with such gas which contains relatively large amounts of entrained gasoline, water and solid particles, and accordingly, numerous devices have been devised for "cleaning" fuel gas prior to delivery.

However, most of such devices are either relatively expensive to construct and operate, or relatively inefficient, and in many instances they require constant inspection and the replacement of parts at short time-intervals.

With the aforementioned limitations and deficiencies of known apparatus in mind, it is an object of the present invention to provide a novel fuel gas separator which is relatively simple in construction and operation, and which can operate over long periods of time with infrequent inspection and replacement of parts. More particularly, it is an object to provide such a separator which does not contain any moving parts and which achieves the desired separation of water, gasoline and solid particles from the fuel gas by mechanical means, as compared with chemical means or the application of heat.

Another object is to provide such a separator which includes a plurality of filter elements, each of which is particularly suitable for the removal of an objectionable component from the fuel gas.

A further object is to provide a novel fuel gas separator which includes a plurality of filter elements, each of which is separately replaceable or cleanable. More particularly, it is an object to provide such a separator which contains different types of filter elements, each of which can either be readily replaced or quickly cleaned without adversely affecting the other elements which might not require cleaning or replacement at that time.

Yet another object is to provide such a novel fuel gas separator which can be installed and maintained by relatively unskilled personnel.

I have discovered that the above objects and advantages are achieved by a novel fuel gas separator which contains three different types of filtering elements or assemblies mounted in a common housing with the fuel gas passing therethrough in sequence, said elements or assemblies being removable for cleaning or replacement. One of the filtering assemblies contains cylindrical members made of fiber glass for removing from the fuel gas water and solids such as sand scale and iron sulfide. Another of the assemblies includes a pad of polyurethane positioned adjacent to a fixed wall against which the fuel gas is directed for the removal of gasoline therefrom, and the third assembly contains cup-shaped filter members made of wire screening coated with Teflon for the removable of additional iron sulfide from the gas.

DESCRIPTION OF THE PREFERRED EMBODIMENT

Figure 1:
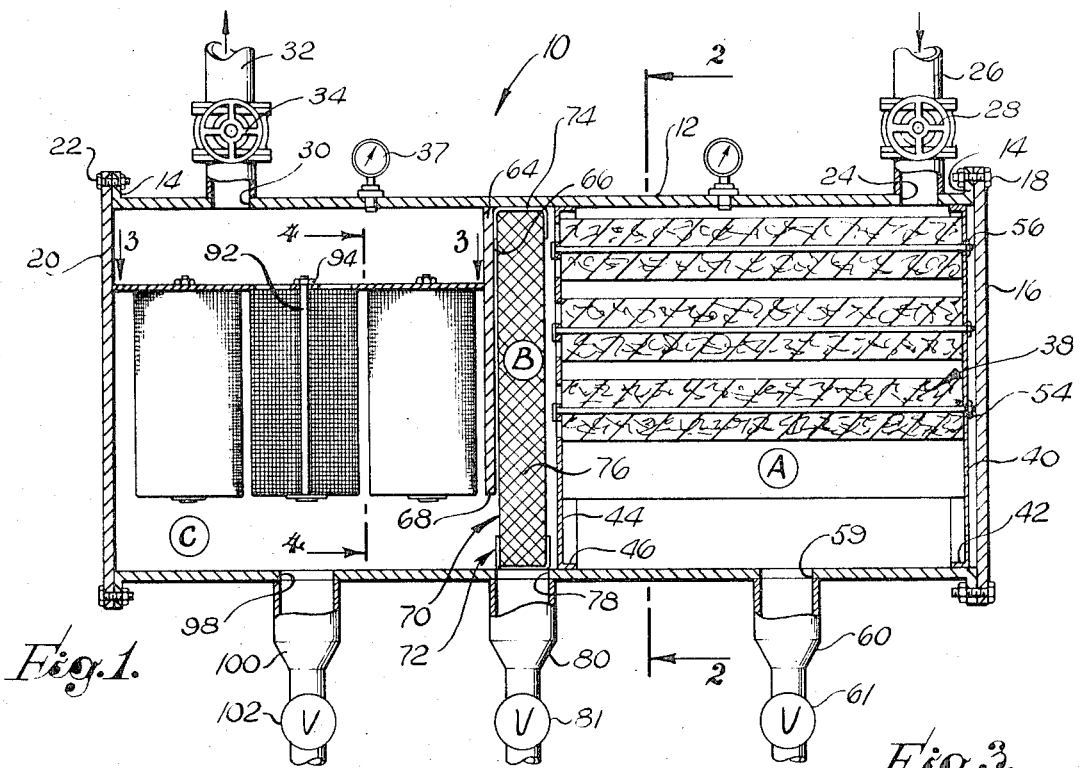
FIG. 1 is a longitudinal, sectional view of one form of fuel gas separator constructed in accordance with the teachings of the present invention.

Referring to the drawing more particularly by reference numerals, specifically FIG. 1, the number 10 indicates generally a fuel gas separator embodying the teachings of the present invention, which includes three chambers, A, B and C, through which the fuel gases pass, in sequence.

The aforementioned chambers are contained in a housing 12 of elongated cylindrical configuration with open ends, which has radially extending flanges 14 at each end thereof. An outlet end plate 16 is removably fastened to the flange at one end of the housing by means of bolts 18, and an outlet plate 20 is removably fastened to the flange at the other end of the housing by means of bolts 22.

An inlet opening 24 is provided in the upper portion of the housing at one end thereof, leading into chamber A, with an inlet pipe 26 connected thereto, said pipe leading from a source of fuel gas such as a well or scrubber. A conventional inlet globe valve 28 is provided to control the flow of gas into chamber A.

A corresponding outlet opening 30 is provided in the upper portion of the housing 12 adjacent the other end thereof, leading from chamber C, and connected thereto is an outlet pipe 32 provided with an outlet valve 34, the outlet pipe being in communication with a storage facility of conventional construction.

Pressure gauges 36 and 37 are provided in communication with chambers A and C, respectively, for a purpose to appear.

Figure 5:
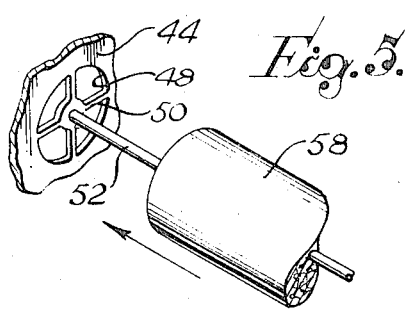
FIG. 5 is a fragmentary, perspective view of one of the filter cylinders which are shown in FIG. 2, positioned on its supporting rod and spaced from the end wall of the cylinder cartridge.

Positioned within chamber A is a removable filter cylinder cartridge 38 which includes an outer end wall 40 having a peripheral flange 42 in engagement with the inner surface of the housing 12, and an inner end wall 44 with a similar peripheral flange 46 in engagement with the aforesaid inner surface of the housing 12. The inner end wall 44 is provided with a plurality of spaced apart, circular fluid passageways 48 (FIGS. 2 and 5), each of which contains a spider 50 for receiving and supporting one end of a support rod 52 which is fastened thereto either by welding or by a threaded engagement. The other ends of the support rods 52 are received in spaced apart openings 54 contained in the outer end wall 40, with nuts 56 being threaded mounting on the ends of said rods.

Figure 2:
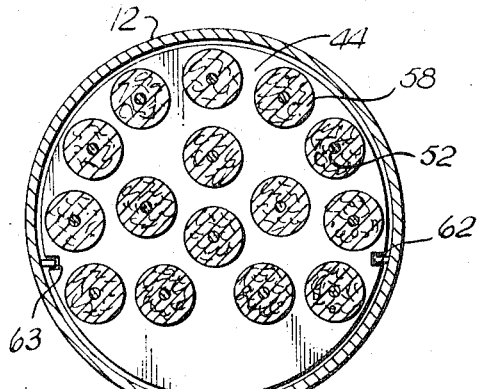
FIG. 2 is a vertical, sectional view taken on the line 2—2 in FIG. 1.

Supported on the rods 52 are a plurality of filter cylinders 58 made of a material such as fiber glass, the ends of the cylinders being in engagement with the end walls 40 and 44. As shown in FIG. 2, the filter cylinders 58 are spaced apart to permit the incoming fuel gas to flow around them, and there is a space between the lower bank of cylinders and the bottom portion of the housing 12, to receive entrained materials which collect on and then fall or are flushed from the outer surfaces of the cylinders, such materials passing through a first discharge outlet 59 contained in the bottom portion of the housing 12 in the chamber A, and thence through a discharge pipe 60 (FIG. 1). A discharge valve 61 is provided in the pipe 60 to control the flow of material from chamber A.

As shown in FIG. 2, the inner wall of the housing 12 in chamber A is provided with opposed, longitudinally extending ribs 62 which are received in grooves 63 provided in the end walls 40 and 44, whereby the filter cylinder cartridge 38 can be inserted into chamber A in only one position, i.e., with the bottom roll cylinders spaced above the first discharge outlet 59, as previously described.

As shown in FIG. 1, chamber B is bounded on one side by the inner end wall 44 of filter cylinder cartridge 38, and the other side is bounded by a fixed baffle plate or wall 64 with a face 66, the wall 64 extending downwardly from the upper portion of the housing 12, but terminating short of the bottom portion thereof to provide a gas passageway 68.

Positioned in chamber B is a filter pad assembly 70 which includes a supporting annular ring 72 of V-shaped cross section with an outer wall portion 74 in engagement with the inner surface of the housing 12, the ring receiving and supporting a filter pad 76 made of a material such as polyurethane.

A second discharge outlet 78 is provided in the bottom portion of the housing 12 in substantial radial alignment with the face 66 of the wall 64, and a discharge pipe 80 is connected to said outlet. A discharge valve 81 is contained in discharge pipe 80 to control the flow of material from chamber B.

Figure 3:
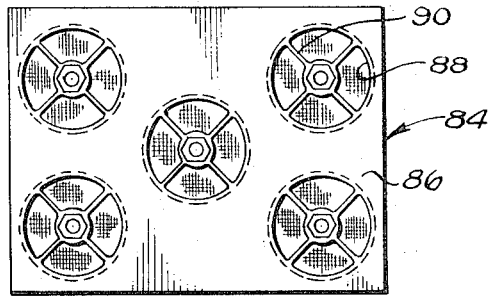
FIG. 3 is a horizontal, sectional view taken on the line 3—3 in FIG. 1.
Figure 4:
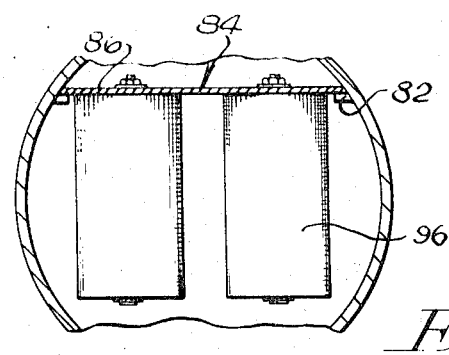
FIG. 4 is a fragmentary, vertical, sectional view taken on the line 4—4 in FIG. 1.

Turning to chamber C and FIG. 4, longitudinally extending ribs 82 are provided on the inner surface of the housing 12 to support a filter screen assembly 84 which includes a support plate 86 (FIG. 3) provided with a plurality of spaced apart circular gas passageways 88, each of which is provided with a spider 90 to support one end of a rod 92 which is fastened thereto as by means of a nut 94. Supported on the rods 92 are a plurality of cylindrical filter screen members 96 of cup-like configuration, said members being made of 200 mesh stainless steel screen coated with a non-wettable material such as Teflon.

The lower ends of the filter members 96 are spaced above the inner surface of the housing 12 as shown in FIG. 1, to provide a space for receiving entrained materials which can then pass from the housing through a third discharge outlet 98 and then through a discharge pipe 100 connected thereto. A discharge valve 102 is provided in pipe 100 to control the flow of material from chamber C.

In operation, fuel gas containing entrained liquids such as water and gasoline, and entrained solids such as sand, scale, and iron sulfide, enter chamber A through inlet pipe 26 from a well or scrubber, and flow through and around the filter cylinders 58. I have found that considerable amounts of water and solid materials such as sand, scale and iron sulfide, collect on the outer surfaces of the filter cylinders 58, and are then washed downwardly into the space below the bottom row of cylinders.

From chamber A, the gas flows through the passageways 48 contained in the inner end wall 44, and are directed through the filter pad 76 and against the surface 66 of the wall 64. In chamber B, entrained gasoline is collected in the filter pad 76 and condenses on the wall 66, and flows downwardly therefrom and into the second discharge outlet 78.

Gas from chamber B then flows under the bottom edge 68 of the wall 64, and into chamber C, where it flows upwardly, around and through the filter screen members 96 and thence out through the outlet pipe 32. Inasmuch as the screen members 96 are coated with a non-wettable material such as Teflon, additional quantities of iron sulfide collect on the outer surfaces thereof, and eventually drop or are flushed therefrom into the bottom portion of chamber C and into the third discharge outlet 98.

As solid materials and liquid collect in the lower portions of chambers A, B and C as a result of the filtering action of the several filtering units, as described above, there will be an increased resistance to the flow of fuel gas through the device. This will be shown by a gradually increasing difference between the inlet and outlet gas pressures as shown on pressure gauges 36 and 37.

When the pressure difference has increased to a predetermined amount, outlet valve 34 is closed, and each of the discharge valves 61, 81 and 102 are first opened and then closed in sequence, to "blow-down" the filtered liquid or solid materials collected in the bottom portions of the chambers A, B and C.

After the filtered liquids and materials are discharged into suitable receptacles and the respective discharge valves are closed, the outlet valve 34 is reopened and the filtering process is resumed.

As mentioned hereinabove, one of the main problems with existing fuel gas separators, is the difficulty of cleaning and/or replacing the various filter elements. In the present construction, all of the filter assemblies are easily removable for inspection, cleaning and/or replacement.

Thus, to remove the filter cylinder cartridge 38 from chamber A (with valve 28 closed), it is only necessary to remove the bolts 18 and the inlet end plate 16, thereby exposing the outer end wall 40 of the cartridge. The cartridge 38 can then be easily slipped out of the housing 12, and the filter cylinders 58 replaced by unscrewing the nuts 56, and removing the cylinders from the support rods 52.

With the filter cylinder cartridge 38 removed from the housing 12, the filter pad assembly 70, which is adjacent to the wall 34, can be easily slipped out of the housing for inspection and the cleaning or replacement of the filter pad 76.

After the filter pad assembly 70 and the filter cylinder cartridge 38 have been recleaned or the filter elements replaced, the filter pad assembly is first reinserted and positioned adjacent the wall 64, and the filter cylinder cartridge is then returned to its position within the housing with the guide ribs 62 being received in the grooves 63.

The filter screen assembly 84 can also be easily and quickly removed in like manner from the chamber C by first removing the outlet end plate 20 and then sliding the support plate 86 on the ribs 82. Here again, the screen members 96 can be cleaned or replaced, the entire filter screen assembly 84 easily reinserted into operative position, and the outlet end plate 20 replaced.

Thus, it is apparent that there has been provided a novel fuel gas separator, which fulfills all of the objects and advantages sought therefore.

I claim:

1. A fuel gas separator, comprising in combination:
   a housing having first, second and third chambers therein;
   a gas inlet into the first chamber for admitting fuel gas containing entrained liquid and solid particles;
   a gas outlet from said first chamber;
   a plurality of elongated cylindrical filter members in said first chamber positioned in spaced-apart relationship between the gas inlet and the gas outlet, whereby fuel gas flows therethrough in flowing from said inlet to said outlet;
   a discharge opening in communication with the first chamber;
   a gas inlet in the second chamber in communication with the gas outlet from the first chamber;
   a fixed wall in the second chamber, in opposed relationship with the gas inlet in the second chamber, positioned such that fuel gas entering said inlet is directed toward said wall;
   a filter pad positioned adjacent to said fixed wall, between said wall and the gas inlet into said second chamber;
   a discharge opening in communication with the second chamber;
   a gas outlet from said second chamber;
   a gas inlet in the third chamber in communication with the gas outlet from the second chamber;
   a gas outlet from the third chamber;
   a plurality of filter screen members in said third chamber positioned between the gas inlet thereto and the gas outlet therefrom, whereby fuel gas flows through said filter screen members in flowing from said inlet to said outlet; and
   a discharge outlet from said third chamber.

2. A fuel gas separator as described in claim 1 in which the filter members in the first chamber are made of fiber glass, the filter pad in the second chamber is made of polyurethane, and the screen members in the third chamber are made of wire mesh coated with Teflon.

3. A fuel gas separator as described in claim 1 in which;
   the housing has two open opposed ends covered by removable cover plates; and
   the cylindrical filter members in the first chamber are supported in a removable cartridge adjacent to one of said cover plates, whereby when said cover plate is removed, said removable cartridge is removable from the first chamber for cleaning or replacement.

4. A fuel gas separator as described in claim 3 in which the filter screen members in the third chamber are supported on a removable support member adjacent to the other of said cover plates, whereby when said cover plate is removed, the removable support member and the filter screen members are removable from the third chamber for cleaning or replacement.

5. A fuel gas separator as described in claim 1 in which the cylindrical filter members are contained in a removable cartridge having outer and inner walls, and the inner wall contains a plurality of spaced-apart passageways which comprise the gas outlet from the first chamber.

6. A fuel gas separator as described in claim 5 in which the filter pad is supported in an annular ring which is positioned adjacent to the fixed wall, between said fixed wall and the inner wall of the removable cylindrical filter cartridge.

7. A fuel gas separator as described in claim 1 in which the cylindrical filter members are contained in a removable cartridge comprising:
   opposed, spaced apart inner and outer walls
   a plurality of supporting rods extending between the walls receiving and supporting the cylindrical filter members thereon, each of said filter members extending substantially from wall to wall; and
   a plurality of gas passageways in the inner wall in alignment with the ends of the filter members adjacent thereto, said gas passageways being the gas outlet from the first chamber whereby fuel gas flows through said filter members prior to flowing through said passageways.

8. A fuel gas separator as described in claim 1 in which the filter pad in the second chamber is supported in an annular ring.

9. A fuel gas separator as described in claim 1 in which the filter screen members are supported on a removable plate which extends across the third chamber between the gas inlet thereto and the gas outlet therefrom, said plate containing gas passageways for the passage of fuel gas therethrough.

10. A fuel gas separator as described in claim 1 in which the filter screen members are contained in a removable assembly, comprising:
    a supporting plate removably mounted within the third chamber;
    a plurality of rods removably fastened to said plate receiving and supporting said filter screen members, said members being cup-shaped with an open end in engagement with said plate; and
    a plurality of gas passageways in said plate in alignment with the open ends of the filter screen members, whereby fuel gas flows through said filter screen members prior to flowing through said passageways.

* * * * *